July 12, 1927.
C. ROGERS
LEG HOLDER
Filed March 23, 1927
1,635,638
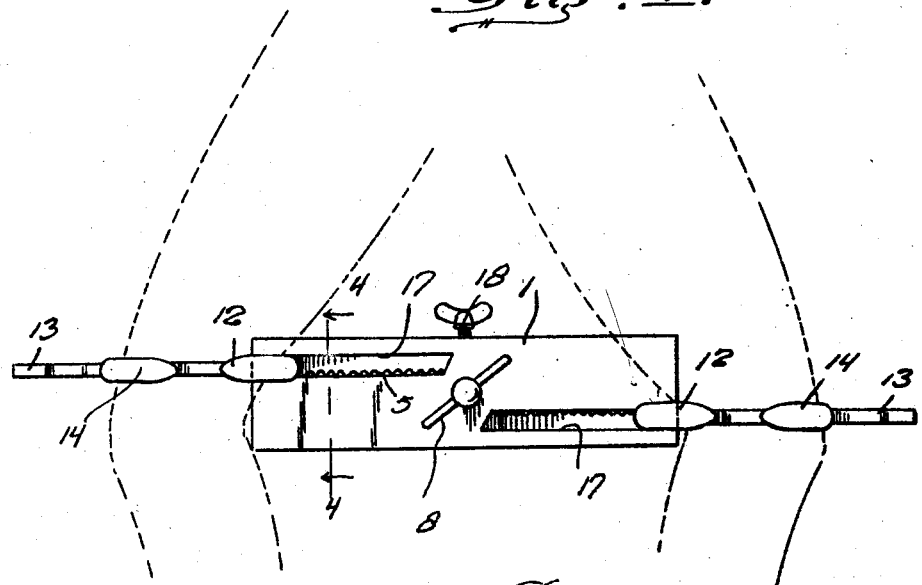
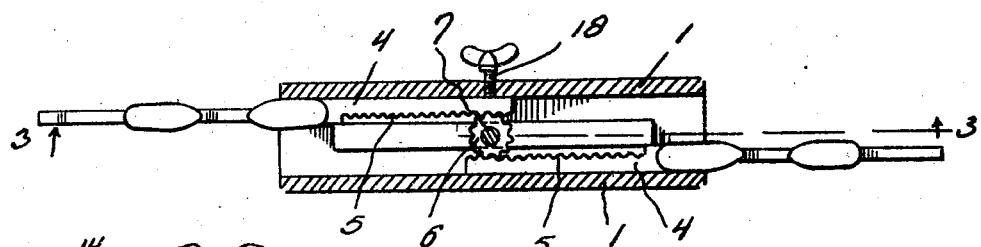
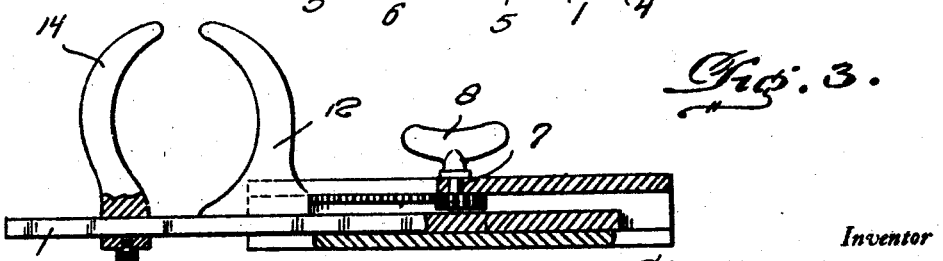
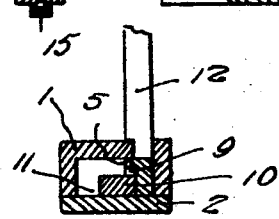
Inventor
Chester Rogers,
By *Clarence A. O'Brien*
Attorney Patented July 12, 1927.

1,635,638

UNITED STATES PATENT OFFICE.

CHESTER ROGERS, OF GOIN, TENNESSEE.

LEG HOLDER.

Application filed March 23, 1927. Serial No. 177,667.

This invention relates to a device for holding the leg particularly adapted for use in performing operations and treatments of the body, where it is necessary that the legs be held in a certain position during the operation.

An object of the invention resides in providing a device of the above mentioned character in which suitable leg gripping members having adjustable leg engaging elements permitting the ready application of the device to the leg and which includes mechanism for operating the leg holding members in desired position, through the proper relative adjustments of the members.

The invention further comprehends the provision of suitable casing in which a pair of leg holding members are slidably mounted for relative movement upon the operation of a suitable manually adjustable means, so as to hold the legs in a proper position of adjustment between engaging elements carried by the holding members.

The invention further comprehends numerous other objects residing in the specific construction and relation of the parts for carrying out the invention, which are more particularly set forth in the following description and claim directed to a preferred form of the invention, it being understood however, that various changes in the size, shape, and relation of the parts may be made without departing from the spirit and scope of the invention as herein set forth.

In the drawing forming part of this application:—

Figure 1 is a plan view of the device indicating diagrammatically the manner in which it is applied in use.

Fig. 2 is a view similar to Fig. 1, showing the casing in horizontal section for illustrating the mechanism to adjust the leg holding members.

Fig. 3 is a sectional view taken on the line 3—3 of Fig. 2.

Fig. 4 is a sectional view taken on the line 4—4 of Fig. 1.

A casing is indicated at 1 which is preferably U-shaped in cross section, and open at the opposite ends, the bottom edges receiving a suitable cover plate 2 for cooperation therewith to form a rectangular housing to mount the remaining elements of the device in operative relation therewith. Suitable leg holding members 4, there being two of such members used, are duplicates and have the similarly formed ends reversed with respect to each other as shown in Fig. 2.

One end of each of the members is provided with a suitable rack 5 positioned in the casing 1 so that the racks of each member are in opposed relation and intermeshed with the operating pinion 6 carried by the rotatable shaft 7 mounted rotatably in the casing 1. One end of the shaft 7 extends beyond the casing, and is provided with the operating handle 8 so that the operating gear 6 may be suitably manually rotated for sliding the members 4 in and out of the casing in opposite directions.

The edge portion of the members 4 provided with the rack teeth are recessed as indicated at 9 in Fig. 4 to receive the guide tongues 10 mounted on the cover plate 2 of the casing. This guide tongue 10 serves to form a guideway 11 for the major portion of each of the leg holding members in cooperation with the side walls of the casing 1, as may be clearly ascertained from Fig. 4.

This will prevent any twisting of the leg holding members in any of the operative positions of adjustment thereof in the casing, and permit the ready assembling of the parts through the cooperation of the cover 2 in the casing 1.

The central portion of each leg holding member 4 is provided with a lateral curved extension 12 forming one leg engaging element on each member while the opposite free end from that formed with the rack 5 is formed to provide a supporting bar 13 for the adjustable leg engaging element 14. Each of the elements 14 has a suitable head formed with an opening to slidably receive the supporting bar 13 and are adapted for interlocked connection therewith, through the provision of a suitable set screw 15, in the head of the element.

The upper face of the casing 1 is slotted as indicated at 17 from the end portion to the central portion in alinement with each of the elements 12 in order to permit adjustment of the leg holding members so as to bring the elements on both members in adjacent relation when it is desired to hold the legs close together.

One side of the casing 1 as shown in Fig. 2 carries a suitable set screw 18 threadedly mounted therein and adapted to engage one of the members 4 in radial alinement with the operating pinion 6 so as to provide a binding action thereon in order to lock the elements 4 in any set position.

From the above description, it will be apparent that a highly simple and advantageous leg holding device has been provided by the present invention, in which the engaging elements 14 may be suitably adjusted on the bar 13 to first receive the leg, either below or above the knee in its preferred use of the device, and may then be adjusted to the approximate position shown in the drawing to retain the legs engaged between the elements 14 and 12 of each leg holding member.

Thereupon, the handle 8 may be rotated for rotating the operating gear 6 and through cooperation with the racks 5 on the members 4 they may be slidably moved in the casing 1 toward or away from each other, within the limits of movement provided by the length of the rack 5 in order to obtain the desired adjustment thereof, following which the set screw 18 is turned inwardly within the casing to frictionally engage one of the members and lock the same against the pinion 6 which will automatically lock the other member 4, and retain the parts set in adjusted position.

It will be further clear that the cover 2 with the guide tongue pin provides a special cooperation with the casing 1 for housing the element 4 in slidable relation with respect to one another, and preventing a twisting movement thereof, in such a manner that the entire mechanism may be quickly assembled or disassembled in order that it may be stored in a relatively small space during transportation.

In this way, the invention is useful to doctors, surgeons and the like in performing minor operations and treatments in the patients' homes, and the device may be readily set up when desired.

Having thus described my invention, what I claim as new is:—

A device of the class described, comprising a U-shaped casing, a cover plate mounted on said casing and provided on the inside with a longitudinally extending guide tongue, said guide tongue cooperating with the casing to form guideways therein, a pair of leg holding members slidably mounted in the guideways in said casing, rack members formed on the inner ends of said leg holding members in opposed relation, an operating pinion engaged with the rack of said members, means carried by the casing for holding and rotating said operating pinion, means carried by the casing for locking said members against movement therein, and relatively adjustable leg engaging elements carried by said leg holding members.

In testimony whereof I affix my signature.

CHESTER ROGERS.